(12) United States Patent
Polcuch et al.

(10) Patent No.: US 11,050,378 B2
(45) Date of Patent: Jun. 29, 2021

(54) INDUCTION MOTOR HEALTH MONITORING METHOD

(71) Applicant: Parker-Hannifin Corporation, Cleveland, OH (US)

(72) Inventors: Eric Polcuch, Mission Viejo, CA (US); Bradley Conn, Mission Viejo, CA (US)

(73) Assignee: Parker-Hannifin Corporation, Cleveland, OH (US)

( * ) Notice: Subject to any disclaimer, the term of this patent is extended or adjusted under 35 U.S.C. 154(b) by 251 days.

(21) Appl. No.: 16/364,531

(22) Filed: Mar. 26, 2019

(65) Prior Publication Data

US 2020/0021221 A1 Jan. 16, 2020

Related U.S. Application Data

(60) Provisional application No. 62/811,124, filed on Feb. 27, 2019, provisional application No. 62/696,916, filed on Jul. 12, 2018.

(51) Int. Cl.
*H02P 23/26* (2016.01)
*H02P 23/14* (2006.01)
*H02P 23/00* (2016.01)

(52) U.S. Cl.
CPC .......... *H02P 23/26* (2016.02); *H02P 23/0013* (2013.01); *H02P 23/14* (2013.01)

(58) Field of Classification Search
CPC ................................ H02P 23/26; H02P 23/14
USPC .................................................. 318/729, 727
See application file for complete search history.

(56) References Cited

U.S. PATENT DOCUMENTS

| | | | | |
|---|---|---|---|---|
| 5,519,300 A | * | 5/1996 | Leon | G01R 31/343 318/729 |
| 8,253,366 B2 | * | 8/2012 | Emoto | G01R 31/50 318/490 |
| 8,975,845 B2 | * | 3/2015 | Guzelgunler | H02P 1/46 318/400.22 |

* cited by examiner

*Primary Examiner* — David Luo
(74) *Attorney, Agent, or Firm* — Renner, Otto, Boisseile & Sklar, LLP

(57) ABSTRACT

A system and method for determining the health of a motor drive system is provided, where a motor is coupled to a common motor control and a single or plurality of other motors are coupled to the common power source. Current data corresponding to current provided to the motor is obtained via a sensor connected to an electrical input of the motor, and voltage data corresponding to a voltage provided by the common motor control is also obtained. Based on the current data and the voltage data, a motor current provided to the motor and a motor voltage to current phase shift (or power factor) are determined, and the health of the motor drive system is determined from the motor phase shift (or power factor) and the motor current.

19 Claims, 5 Drawing Sheets

| Monitored Parameter | Single Motor Phase Current | Single Motor PF | Bus Current - All Motors | Bus PF - All Motors |
|---|---|---|---|---|
| Single Actuator High Drag | Above Family | Above Family | no measurable effect | no measurable effect |
| Actuated Structure High Drag | Family close but High for Opration | Family close but High for Opration | Family close but High for Opration | Family Close but High for Operation |
| High Applied Load | High but consistent with Operation | High but consistent with Operation | High but consistent with Operation | High but consistent with Operation |
| Motor Winding to Winding Short | Motor Out of Family and high | PF out of family and high | Slight Phase imbalance | Slight Phase imbalance |
| Motor Open Winding | 1. Zero if sensed leg open 2. Other Legs ~150% | PF out of family and high | Slight Phase imbalance | Slight Phase imbalance |
| Actuator internal Jam | Motor Out of Family and high | Motor Out of Family and high | Bus Slightly high | Bus Slightly high |
| Actuated Structure Jam | Motor in Family and high | Motor in Family and high | Bus very high | Bus high high |
| Motor Jam | Motor Out of Family and high | Motor Out may be in family | Bus Slightly high | Bus Slightly high |
| Actuator Open Failure | Failed Actuator Current Low but >0 | Failed Actuator PF Low but >0 | Likely none | Likely Above normal for current |
| No-Back Failed Open with Aiding Load | May be High or low depending on Structure Stiffness | Power Factor opposite sign from Family | May be High or low depending on Operating Condition | Likely Low for condition |
| Clutch Slip | Motor Out of Family and moderately high | Motor Out of Family and high | Bus Slightly high | Bus Slightly high |
| One or More not reach End of Stroke | Motor Out of Family and high | PF out of family and high | Slight Phase imbalance | Slight Phase imbalance |

Fig. 5

INDUCTION MOTOR HEALTH MONITORING METHOD

RELATED APPLICATION DATA

This application claims priority of U.S. Provisional Application Nos. 62/696,916 filed on Jul. 12, 2018 and 62/811,124 filed on Feb. 27, 2019, each of which is incorporated herein by reference in its entirety.

FIELD OF INVENTION

The present invention relates to motor driven systems and, more particularly, to a method and device for monitoring the health of multiple motor driven systems coupled to a common power source.

BACKGROUND OF THE INVENTION

For systems utilizing multiple induction motors powered by a fixed bus or utilizing multiple induction motors from a single controller as disclosed in U.S. Pat. No. 9,190,942, either monitoring of the motor is not provided by the bus or, if monitoring is provided, there is no way to segregate which motor may be experiencing a health or fault issue. Note that in the case of near synchronous operation as described in U.S. Pat. No. 9,190,942, the control electronics can monitor the overall bus power condition for overall system health and fault monitoring. However, the control electronics do not provide information on individual motor or actuator health.

Accordingly, there is a need in the art for a system and method of monitoring the health of motors, such as induction motors and induction motor driven systems, when a plurality of motors are coupled to a common power source.

SUMMARY OF THE INVENTION

A device and method in accordance with the present invention provide a simple monitoring scheme that can be easily applied to any number of motors. The monitoring scheme minimizes added cost associated with sensors, wire count and signal conditioning, as well as size of the monitoring software. More specifically, both current and voltage-to-current phase shift (or power factor) measurements corresponding to each motor are obtained and compared to threshold values and/or ranges. A health of the motor and/or drive system is inferred based on the results of the comparison.

According to one aspect of the invention, a system for determining the health of a motor drive system includes: a common motor controller; at least one motor electrically coupled to the common motor controller; at least one current sensor operatively coupled to a respective motor of the at least one motor; and a monitor coupled to the at least one current sensor, the monitor configured to: obtain voltage data corresponding to a voltage provided by the common motor controller; obtain from each of the at least one current sensor a motor current for the respective motor; determine, based on the motor current and the voltage data, at least one of a motor phase shift or power factor; and determine the health of the motor drive system based on the at least one motor phase shift or power factor and the motor current.

In one embodiment, in determining the health of the motor drive system the monitor is configured to: use the motor current and at least one of the motor phase shift or power factor to compare to respective thresholds in a look-up table; identify a motor current entry and at least one of a phase shift or power factor entry which is outside acceptable limits of the thresholds in the look-up table; retrieve a health condition from the look-up table that corresponds to the identified motor current entry and the at least one phase shift or power factor entry; wherein providing the alert includes providing the health condition as part of the alert.

In one embodiment, the at least one motor comprises a plurality of motors, and the monitor is configured to determine the health of the motor drive system based on i) the determined motor current and at least one of phase shift or power factor for one motor of the plurality of motors, and ii) motor current and at least one of phase shift or power factor for other motors of the plurality of motors.

In one embodiment, the monitor is communicatively coupled to the common motor control to obtain the voltage data from the common motor control.

In one embodiment, the monitor is further configured to disable or reconfigure a motor or motor drive system that has been determined to be abnormal.

In one embodiment, in determining the health of the motor drive system the monitor is configured to determine that the motor drive system health is abnormal when the motor current and at least one of the motor phase shift or power factor do not correspond to at least one of a predetermined phase shift or power factor window and a predetermined motor current window, respectively.

In one embodiment, in determining the health of the motor drive system the monitor is configured to determine that the motor health is abnormal when motor current and at least one of the motor phase shift or power factor correspond to at least one of high output torque, low output torque, motor stall, motor operation in a predetermined quadrant, an open circuit or a short circuit.

In one embodiment, the plurality of sensors comprises at least one sensor capable of outputting a signal proportional to the current in at least one phase of a poly-phase electric motor.

In one embodiment, the sensor comprises at least one of a coil of wire positioned to sense at least one individual input phase of the motor, a resistor or a hall effect device.

In one embodiment, each current sensor comprises a first and second electrical conductor, and the first electrical conductor of each current sensor is electrically connected together to form a common lead, and the second electrical conductor from each current sensor and the common lead are connected to the controller such that a total number of electrical conductors from the plurality of current sensors to the controller is the number of motors or the number of monitored subsystems of motors plus one.

In one embodiment, the monitor is configured to provide an alert upon the health of the motor drive system being abnormal.

According to another aspect of the invention, a method of determining the health of a motor drive system that includes at least one motor coupled to a common motor controller includes: obtaining, via a sensor connected to an electrical input of the at least one motor, current data corresponding to current provided to the at least one motor; obtaining voltage data corresponding to a voltage provided by the common motor controller; determining, based on the current data and the voltage data, at least one of a motor phase shift or power factor; and determining the health of the motor drive system based on the motor current and the at least one motor phase shift or power factor.

In one embodiment, determining the health comprises: using the determined motor current and at least one of phase shift or power factor to access a look-up table; identifying a motor current entry and at least one of a phase shift or power factor entry in the look-up table that corresponds to the motor current and at least one of phase shift or motor power factor; and retrieving a health condition from the look-up table that corresponds to the identified current entry and at least one of the phase shift or power factor entry.

In one embodiment, the at least one motor comprises a plurality of motors, and determining the health of the motor drive system comprises basing the determination on i) the determined motor current and at least one of phase shift or power factor for one motor of the plurality of motors, and ii) motor current and at least one of phase shift or power factor for other motors of the plurality of motors.

In one embodiment, the method further includes: annunciating the health condition; and at least one of disabling the motor drive sub-system, placing the system into a predetermined safe operating mode, or taking no action upon determining the motor drive system health is abnormal.

In one embodiment, determining the health of the motor drive system comprises determining that the motor drive system health is abnormal when the motor current and at least one of the motor phase shift or power factor are not within a predetermined current threshold and at least one of a predetermined phase shift or power factor threshold, respectively.

In one embodiment, determining the health of the motor drive system comprises determining that the motor drive system health is abnormal when the motor current and at least one of the motor phase shift or power factor correspond to at least one of high output torque, low output torque, motor stall, motor operation in a predetermined quadrant, an open circuit or a short circuit.

In one embodiment, determining the motor current includes determining a peak motor current.

In one embodiment, the method includes coupling conductors from each sensor to a monitor, wherein a total number of electrical conductors from the plurality of sensors to the controller is the number of motors plus one.

In one embodiment, the monitor is part of a motor drive controller that controls power provided by the common motor controller.

In one embodiment, the method includes providing an indication upon the health of the motor drive system being abnormal.

These and other features of the invention are more fully described and particularly pointed out in the description and claims set out below, and this Summary is not intended to identify key features or essential features of the claimed subject matter. The following description and claims and the annexed drawings set forth in detail certain illustrative embodiments of the invention, and these embodiments indicate but a few of the various ways in which the principles of the invention may be used.

BRIEF DESCRIPTION OF THE DRAWINGS

FIG. 5 is an exemplary matrix showing a sample of motor/system conditions and the motor current and power factor corresponding to those conditions in accordance with the invention.

DETAILED DESCRIPTION

Figure 1:
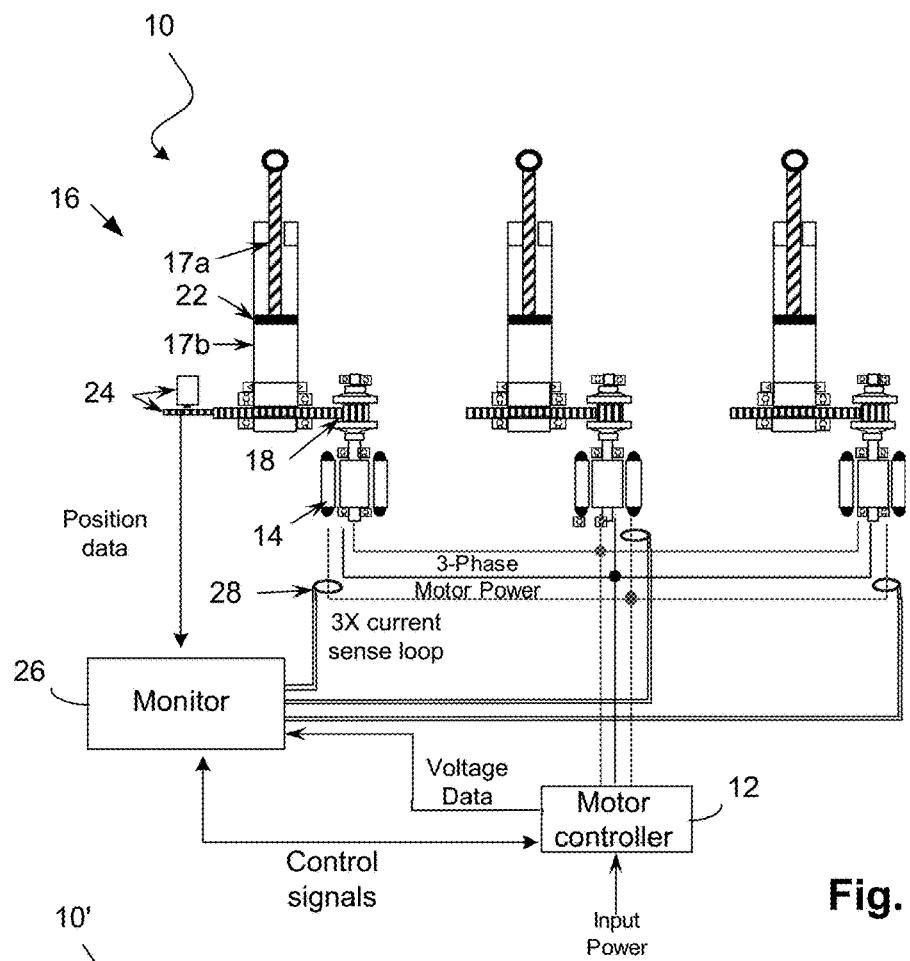
FIG. 1 is a simplified schematic diagram of an exemplary system for monitoring the health of an induction motor driven system in accordance with the invention.

In some electro-mechanical systems, it can be advantageous to power a plurality of different motors from a common power source, such as a common electronic motor drive or a common AC or DC power bus. As used herein an electronic motor drive is defined as a device that provides voltage and current to/from the motor in varying amounts and, in the case of AC drives, at varying frequencies, to control the motor's speed and torque.

Built-in diagnostics typically are not provided with a power bus and thus it can be difficult to know the health of a motor connected to the power bus. Electronic motor drives, on the other hand, typically include built-in diagnostics that perform health monitoring based on conditions at the output of the drive. Thus, such diagnostics are useful when a single motor is connected to the electronic motor drive. However, the built-in diagnostics may not be able to accurately monitor the health of a motor when multiple motors are connected to the same motor drive.

For example, if ten motors are connected to the same electronic motor drive, the drive would need to be sized for the power demand for all ten motors. If each motor is rated for 10 amps full load, then the electronic motor drive would need to be rated for 100 amps in order to power all ten motors at the same time at full load. Now if all motors are experiencing a medium load (e.g., 50%), then the expected current for each motor would be 5 amps and the total current output by the motor drive is 50 amps. If one motor experiences an excessive load (e.g., 15 amps) while the other motors are operating at 5 amps, the total current output by the motor drive will be 60 amps. This is well below the motor drive rating of 100 amps and thus the health monitoring feature of the motor drive does not detect a problem, yet one motor is operating at 150% load. In other words, the overload condition for the one motor is effectively masked by the power rating of the motor drive and the medium load operation of the other nine motors.

For induction motor driven systems in which multiple motors are connected to a common power source, it is useful to have signals and data available to monitor each motor individually. In this manner, an indication of the health and/or failure state of the motor and/or any associated actuator can be determined. It is further beneficial to simplify the sensing system used as well as the number of wires and circuits required to perform such monitoring. The device and method in accordance with present invention provide a simple sensing system/method for determining the health of a motor and/or associated actuator when multiple motors are coupled to a common power source.

In the following, it is assumed that either the motor control does not have a monitoring function (e.g., a simple AC or DC power bus) or that multiple motors are attached to the motor control (e.g., multiple motors coupled to a single electronic motor drive) such that knowledge of any individual motor is mixed with all of the other motors.

Referring now to FIG. 1, illustrated is an exemplary system 10 in accordance with the present invention. The system 10 includes a common motor controller 12 in the form of an H-Bridge controller, although other controller types may be utilized. As is well known, an H-bridge controller is a device that enables power to be applied to a load, such as a motor, in a controlled manner so as to drive the motor in the desired directions. The motor controller 12 receives input power, such as for example AC or DC power, and in the present example provides AC power to a plurality of motors 14, such as induction motors, each of which are electrically coupled to the output of the motor controller 12.

Each motor 14 is operative to effect motion of a movable member 16, which in the example of FIG. 1 is formed by a traveling ball screw 17a and rotating drive tube 17b. The movable member 16 may be of any configuration including but not limited to sliding contact thread, ball screw, roller screw, or rotary output, geared or otherwise, and the like. The movable member 16 may be operatively connected to a specific device, such as a flight control surface of an aircraft (not shown) or other device. In effecting motion of the movable member 16, a gear reducer 18, such as a direct gear drive, a belt drive, etc. may be used to couple each motor 14 to a respective movable member 16. For example, in the case of a movable member 16 embodied as a ball screw each motor 14 is coupled to an input of the gear reducer 18, and an output of the gear reducer 18 is coupled to the rotating drive tube 17b. As the motor 14 rotates, corresponding rotation of the rotating tube 17b is produced via the gear reducer 18 but at a speed reduced relative to that of the motor 14. The rotating drive tube 17b is in threaded engagement with the traveling ball screw 17a, such that rotation of the drive tube 17b causes axial motion of the ball screw 17a. A mechanical dog stop 22 is fixed to the traveling ball screw 17a and is operative to limit axial motion of the ball screw 17a in both directions.

The system 10 may also include a position sensor 24 operatively coupled to the moveable member 16 and/or motor 14 in order to provide position data corresponding to a position of the moveable member 16 and/or to count a number of revolutions of the motor output shaft. The position sensor 24, which may be an encoder, a resolver, or any other sensor known in the art that is capable of sensing linear or angular position, may be indirectly or directly coupled to the movable member 16 and/or the motor 14. For example, the position sensor 24 may be coupled to the output of the gear reducer 18 as shown in FIG. 1, although other coupling points may be utilized, e.g., an input to the gear reducer 18, a motor output shaft, the moveable member 16, etc. Position data from the position sensor 24 may be provided to a motor monitor 26 or to a high level system, which as described in more detail below performs a health monitoring function for each of the motors 14 coupled to the motor controller 12. The motor controller 12 may also exchange control data with the motor monitor 26 including, but not limited to, a voltage angle at the output of the motor controller 12, a current output by the motor controller 12, a voltage to current phase shift (and/or power factor) at the output of the motor controller 12, status information, control commands, etc.

Figure 2:
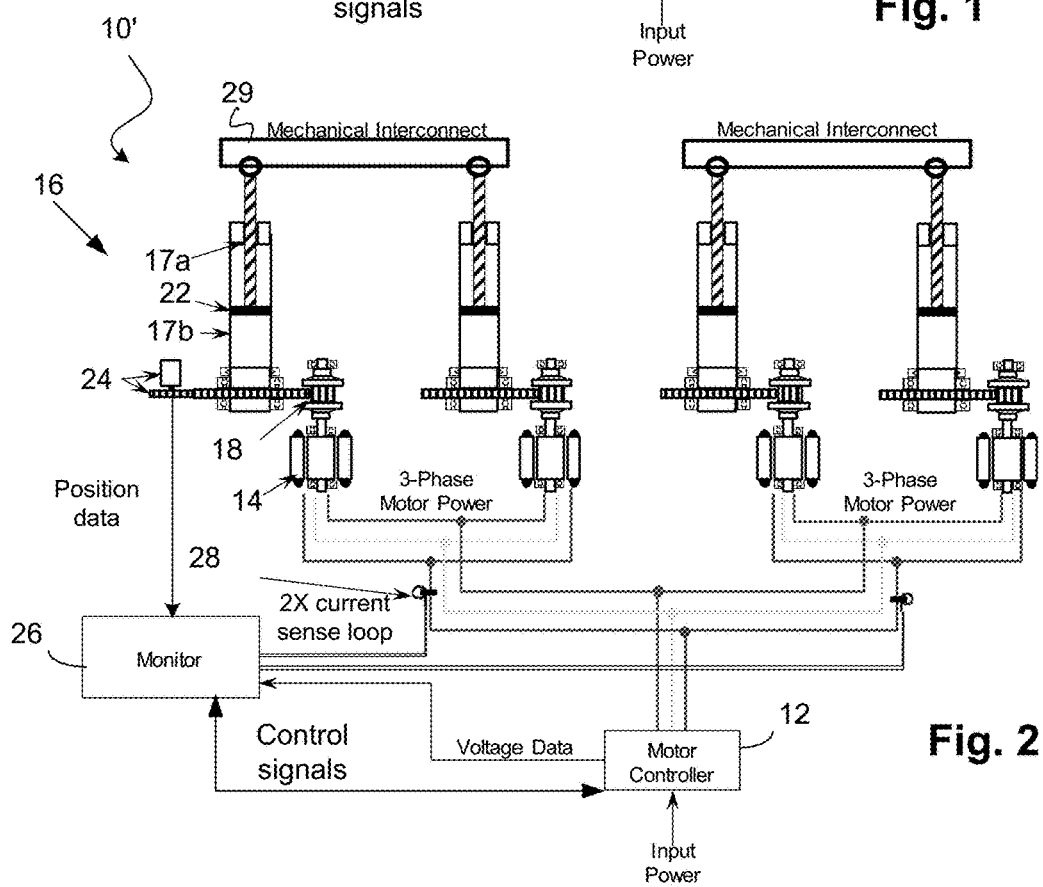
FIG. 2 is a simplified schematic diagram of another exemplary system for monitoring the health of an induction motor driven system in accordance with the invention, where motors are grouped in pairs.

A similar system 10' as indicated in FIG. 2 may be comprised of any combination of subsystems where motor shaft rotation is mechanically coupled 29 at the output, intermediate stages, or motor shaft, such that shaft speeds are synchronized. In such a system, the mechanically linked subsystems may be monitored as a group, instead of monitoring individual motors, using the same logic discussed herein. This method would further reduce the number of sensors, wires, and computing capacity necessary to monitor such a system.

Each motor 14 (or motor subsystem) has a respective sensor 28 for monitoring the current supplied to the motor 14. Each sensor 28 is communicatively coupled to the monitor 26, which uses the current data obtained via the sensor 28 along with the voltage angle data from the motor controller 12 to determine the health of each motor and/or associated actuator. If the motor controller 12 does not have the ability to output voltage angle, the voltage may be sampled by the monitor 26 at the output of the motor controller 12 and the necessary calculations performed to derive the voltage angle or lead/lag condition of the voltage and current. The sensor 28 may be in the form of a coil having a prescribed number of turns, the coil being operatively coupled to one input power phase of the motor 14. The sensor 28 may be, but is not limited to, a simple coil of wire, Hall effect, resistive, or any number of other sensors providing information on the current flow through the wire. Alternatively, each input power phase of the motor 14 may have a sensor coupled thereto to provide data to the monitor 26. The additional sensors can further expand the information available to the monitor 26 and the rate at which motor health can be updated, e.g., a single phase has a peak absolute value (usually squared) twice per electrical cycle, but by monitoring all three phases of a three-phase machine would give six peak measurements per electrical cycle.

The number of turns of the coil can be adjusted to provide a voltage signal as a function of current within a desired range for the monitor circuits. In a multiple motor application, it is further possible to connect one end of each of the sense coils to form a common reference signal. The other end of each coil, along with the common reference signal, then can be provided to the monitor 26 such that the total number of wires from the motors 14 to the monitor 26 is equal to the number of motors (or motor subsystems) plus one.

Figure 3:
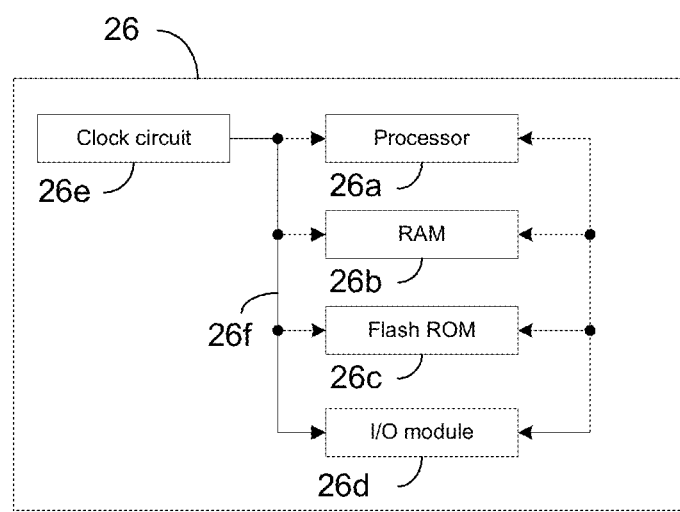
FIG. 3 is a block diagram of an exemplary monitor that can be used to implement the health monitoring in accordance with the invention.

Referring briefly to FIG. 3, illustrated is a block diagram of an exemplary monitor 26 that may be used in the systems 10 of FIGS. 1 and 2. The monitor 26 may be a microcomputer in which a CPU (central processing unit) 26a, a RAM (random access memory) 26b, a flash ROM (read only memory) 26c, an input/output module 26d, a clock circuit 26e and the like are communicatively connected via a system bus 26f. It should be noted that analog circuits could perform the same monitoring function. The monitor 26 is responsible for monitoring components of the drive system apparatus in accordance with the present invention. The RAM 26b is mainly used as a work space, for example, for temporarily storing an intermediate result of processing. The flash ROM 26c stores, in advance, various programs to be executed by the CPU 26a and data to be used in processing. A health monitoring program may be stored in the flash ROM 26c, the health monitoring program being executable by the CPU 26a to carry out steps of a method in accordance with the invention. The I/O module 26d provides digital and/or analog input/output points for receiving and outputting data, while the clock circuit 26e can provide timing signals for the monitor 26.

It should be noted that the motor control function and the monitoring function may reside in separate enclosures, the same enclosure, or even share the same processor depending on the criticality of the control and monitor functions. For example, while the motor controller 12 and the monitor 26 are shown as separate devices, the functions of both devices may be incorporated into a single device.

The implementation of a sensor and monitor in accordance with the invention utilizes knowledge that a time varying current passing through a coil, a resistor, or the like, will produce a voltage that can be measured. For example, a sensor 28 embodied as coil having one or more loops oriented to sense magnetic field fluctuations induced around one phase of the (typically) 3-phase input power of each motor 14 will induce a voltage in the coil, and the resultant voltage is communicated to the monitor 26. Similarly, a resistor coupled in series with one input power phase will produce a voltage drop that can be measured, and a hall-effect device will provide an output voltage that varies with a magnetic field created by the varying current. The monitor 26, regardless of the device that obtains the data, processes the data using a health and fault monitoring method in accordance with the invention. In this regard, a peak current of each motor's current wave form and a phase shift between the phase current and the voltage (and/or power factor) for each motor (or subset of motors) is determined. For the purposes of the monitors discussed in this document, power factor and phase shift can be used interchangeably with appropriate changes in monitor thresholds.

Predefined motor health conditions with current and power factor thresholds may be stored in memory 26c of the monitor 26 along with the individual motor's current and power factor values. The monitor 26 then can evaluate the individual motor's current and power factor relative to the predefined current and power factor threshold values and identify motors that violate the current and power factor thresholds. The monitor 26 also can determine, based on the individual motor current and power factor, the associated health condition for the violated thresholds. In this regard, thresholds and/or windows can be set around the predefined values to provide a range around the respective values in which a mis-match may be found. Possible health conditions include high output torque as with a decrease in motor, actuator or other attached device efficiency, low output torque as with certain open-type of failures (e.g., broken shafts, gears, or other attached equipment), operation of the motor in regenerating mode (e.g., failed no-back), operation of the motor below the pull-out velocity, motor electrical failures such as open circuits or short circuits, motor stall, etc. If a motor is found to be outside the specified threshold for the desired operating mode then the monitor 26 can retrieve the corresponding health condition and provide an assessment of the health of the motor 14, actuator 16, or system 10.

Figure 4:
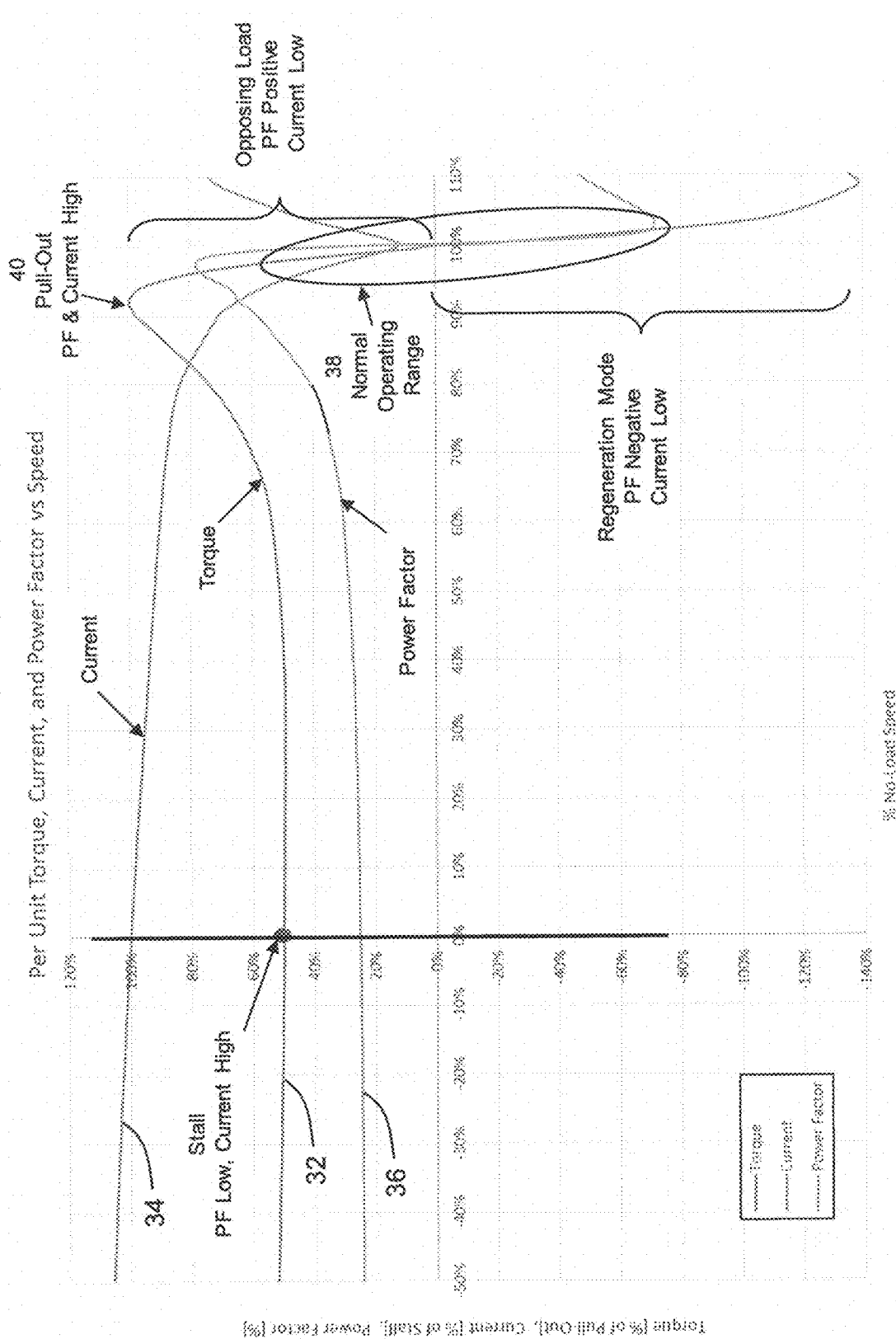
FIG. 4 is a graph showing operation of an exemplary induction motor performance.

Referring now to FIG. 4, illustrated are several curves for an exemplary induction motor 14 that forms part of an exemplary drive system. The curves include a motor per unit speed-torque curve 32, a per unit motor speed-current curve 34 and a motor power factor curve 36. While FIG. 4 illustrates various performance curves for an AC induction motor, motors of different design and with different performance curves are equally applicable to the monitoring methodology described herein.

In the exemplary system, the motor speed-torque curve 32 shows the motor has low torque in the reverse direction with a forward rotating field. As motor speed increases in the forward direction, torque gradually increases and after about 70% of no-load speed rapidly increases, peaking at about 92% of no-load speed (pull-out). Torque then rapidly drops off over the next 8% down to 0 at 100% of no-load speed (synchronous speed).

The motor speed-current curve 34 is nearly flat at 100% of stall current throughout the reverse direction as well as in the forward direction up to about 80% of no-load speed. Between 80% no-load speed and 100% no-load speed (synchronous speed), the current sharply drops toward zero (synchronous speed). In the regeneration mode, speeds greater than 100% of no-load speed, the current sharply rises back to about 80% of stall current.

The power factor curve 36 is relatively low in the reverse direction, staying fairly constant until about 70% no-load speed. After 70% NL speed, the power factor increases, peaking at around 97% of no-load speed. The power factor then sharply drops over the next 3% of no-load speed to 100% (synchronous speed).

Power factor values are very sensitive to load on the leading edge of the torque-speed curve on the high-speed side of the pull-out point (low slip condition 40) with a power factor of zero at synchronous speed and a peak PF near the pull-out point. Power factor again drops as the motor approaches stall such that PF alone is not sufficient to uniquely identify all failure conditions. Note a negative power factor indicates that the motor is in regeneration mode. A combination of peak waveform current and PF provides the most complete information on motor operating condition.

Normal operating range of the motor is identified by the elliptical region 38 illustrated in FIG. 4. Different operating conditions, e.g., motor bearing wear, increased load due to mechanical bind within the system, overload of the motor, etc. can cause the motor to operate outside the normal operating range 38. By analyzing the power factor of the motor and motor peak current, the health and/or status of the motor and/or system can be inferred. For example, if the power factor is at 0.24 and the current is high (e.g., 100% of stall) it can be inferred that the motor is at or near stall. If the power factor is zero and current is low, it can be inferred that the motor is operating at synchronous speed (i.e., it is operating in the normal region).

FIG. 5 is a table 50 illustrating various motor/system operating conditions along with expected operation characteristics for the respective operating conditions. The table 50 includes a plurality of rows 52 and columns 54, where each row 52 corresponds to an operating condition (e.g., high actuator drag, clutch slippage, etc.) and each column 54 corresponds to specific operational characteristics of the motor/system (e.g., current, power factor, etc.). Exemplary monitored operational characteristics include single motor phase current 54a, single motor power factor 54b, bus current for all motors 54c and bus power factor for all motors 54d. The intersection of each row with a respective column identifies the expected operational characteristics for the motor/system operating condition. Thus, for example, a "single actuator high drag" condition can be identified when the individual motor phase current and motor power factor are above the motor phase current and motor power factor for the family of motors (note that the power factor and phase current for all motors is not significant in identifying the drag condition). Similarly, a clutch slip condition can be identified when single motor phase current and single motor power factor are high and out of the family, and bus current (all motors) and bus power factor (all motors) is slightly high.

It should be appreciated that the number of operating conditions and operational characteristics is exemplary, and more or fewer may be employed without departing from the scope of the invention.

It can be further appreciated that the signals may be conditioned with passive filtering and may be analyzed using digital or analog electronic means. There are numerous algorithms and circuit designs in the relevant literature to apply to the signals to determine both peak current and power factor. The signals may be processed by the controller 26 or by a controller of the H-bridge 12, or remotely.

Figure 6:
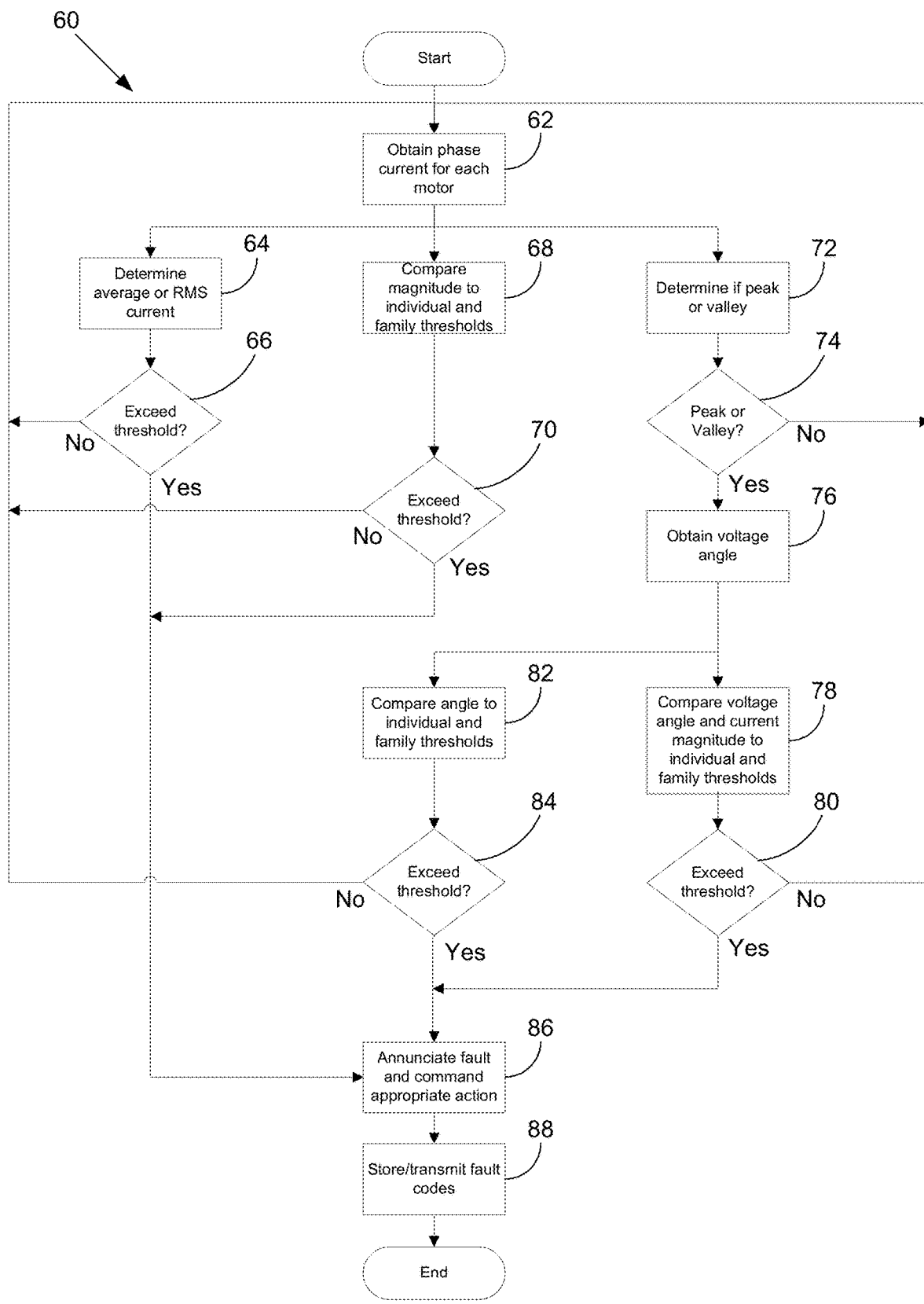
FIG. 6 is a flow chart illustrating exemplary steps of a method in accordance with the invention.

Referring now to FIG. 6, illustrated is a flow diagram 50 that depicts an exemplary method for monitoring health of a motor and/or associated subsystem in accordance with the invention. Although the method descriptions and flow chart may show specific orders of executing steps, the order of executing the steps may be changed relative to the order described. Also, two or more steps described in succession may be executed concurrently or with partial concurrence. One or more of the described or illustrated steps may be omitted.

The exemplary method of FIG. 6 may be implemented using coded instructions (e.g., computer readable instructions) stored on one or more non-transitory computer readable media such as flash memory, read-only memory (ROM), random-access memory (RAM), cache, or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. Typical non-transitory computer readable media include electronic memory devices, magnetic memory devices and optical memory devices. The method may be executed, for example, by the motor monitor 26. In one embodiment, to carry out the method, the logical instructions embodying the method are executed by the processor 26a of the motor monitor 26. Alternatively, the method may be at least partially implemented in hardware of the motor monitor 26 (e.g., an application-specific integrated circuit (ASIC), analog circuit, or the like).

The method may begin at step 62 where a phase current for each respective motor 14 is obtained by the motor monitor 26. Phase current may be obtained from the sensor 28 corresponding to each motor 14, which as noted above can generate a voltage signal proportional to the current provided to the motor. This voltage signal can be provided to the motor monitor 26 in analog or digital form via the I/O module 26d. Next the method splits into three different branches, which may be executed sequentially or in parallel. In a first branch the motor monitor 26 determines the average or RMS current from the motor phase current data provided by the sensor 28, as indicated at step 64. The average or RMS current can be determined relatively quickly by performing calculations on the data provided by the sensor 28 and therefore can be used as an indicator for an instantaneous current spike indicative of a problem with the individual motor. At step 66, if the average or RMS current exceeds a prescribed threshold level, then it can be concluded that the motor is operating abnormally and/or a fault condition exists. As a result, the method moves to step 86 where the motor monitor 26 annunciates the fault and/or commands appropriate action. For example, a fault may be displayed on an operator interface and/or an alarm may be sounded. Additionally, the motor controller 12 driving the set of motors 14 having a member's performance outside of the expected thresholds may be shut-down, may be inhibited, may transition into some form of a safe state, etc., to prevent damage to the motor and/or subsystem. Also, no action may be taken other than annunciation depending on criticality of the detected feature. Next at step 88 codes associated with the fault condition may be stored in memory and/or transmitted to a high-level system monitor. Moving back to step 66, if the average or RMS current does not exceed the prescribed threshold level, then it can be concluded that the individual motor is operating normally and the branch proceeds back to step 62.

Moving back to step 62, in a second branch the method moves to step 68 where the motor monitor 26 compares the individual motor phase current obtained from the sensor 28 to a threshold value for that individual motor, and also to the phase current for the family of motors (e.g., the average phase current for the other motors). For example, if the magnitude of the motor phase current exceeds a motor phase current threshold, or if the magnitude of the motor phase current is different from magnitude of the motor phase current for the family of motors by a prescribed threshold, then it can be concluded that the individual motor and/or connected system is operating abnormally and the method moves to step 86 for fault processing as discussed above. If the magnitude of the individual motor phase current does not exceed the motor phase current threshold and does not differ from the (average) magnitude of the motor phase current for the family of motors, then it can be concluded the individual motor and connected system are operating normally and the method moves back to step 62.

Moving back to step 62, in a third branch the method moves to step 72 where the motor monitor 26 determines if the motor phase current is at a peak or valley, i.e., at a maximum point or a minimum point. Such determination may be made based on known characteristics of the motor phase current for each motor and the phase current obtained from each sensor 28. At step 74, if the motor phase current is not at a peak or valley then the method moves back to step 62. However, if the motor phase current is at a peak or valley then the method moves to step 76 and the motor monitor 26 obtains the voltage angle. The voltage angle may be provided to the motor monitor 26 by the motor controller 12, which may know, based on current operating parameters, the precise voltage angle. The voltage angle may be communicated to the motor monitor 26 via the I/O module 26d, for example, using digital or analog means. The method then proceeds to two sub-branches. In a first sub-branch the motor monitor 26 compares the voltage angle to individual voltage angle and family voltage angle thresholds. If the voltage angle is not within a prescribed range of the individual or family threshold levels, then it can be concluded that an abnormal condition exists and the method moves to step 86 for fault processing as discussed above. If the voltage angle is within the prescribed range of the individual or family threshold levels, then it can be concluded the motor and connected system are operating normally and the sub-branch moves back to step 62.

The operating condition of the motor may be determined by finding corresponding conditions as set forth in FIG. 5. This may be accomplished, for example, by storing power factor and current thresholds in a look-up table along with the health status corresponding to each specific power factor and current threshold. Such look-up table may be stored in memory of the motor monitor 26, such as flash memory 26c. The motor monitor 26 then can access the look-up table, identify motor conditions that exceed the threshold values and retrieve the corresponding health status of the motor 14 and/or connected system.

Moving back to step 76, in a second sub-branch the motor monitor 26 compares the voltage angle and magnitude of the individual motor phase current to individual and family voltage angle and phase current threshold values. If at step 80 the voltage angle and/or magnitude of the individual motor phase current exceed the threshold value and/or differ from the magnitude of the phase current and voltage angle for the family of motors by more than a prescribed threshold, then it can be concluded that the motor and/or connected system are operating abnormally and the motor monitor 26 proceeds to step 86 for fault processing. If at step 80 the voltage angle and magnitude of the individual motor current does not exceed the threshold value and/or do not differ from the magnitude of the phase current and voltage angle for the family of motors by more than a prescribed threshold, then it can be concluded the motor and connected system are operating normally and the method moves back to step 62.

In performing fault processing (steps 86 and 88), the specific fault condition for the motor and/or connected system can be determined by comparing the data for each motor relative to predefined conditions for the individual motor in view of actual operating conditions for the family of motors. In this regard, the motor data (phase current, power factor) for the individual motor and for the family of motors may be used to access the lookup table as discussed above, and upon identifying data matching the current conditions of the motor and the family of motors, the associated condition can be retrieved, annunciated and reported to a high-level system.

The thresholds for currents and power factors in the look-up table may be set with margin above or below the expected value of current or power factor to make monitoring of the system more robust against false indications. These threshold values can be set, for example, at ±20 percent of the expected power factor and current values, and more preferably at 10 percent of the expected power factor and current values. Thus, if the motor phase current and PF for a particular health condition are expected to be 10 amps and 0.8 PF, respectively, then a 10 percent margin on the threshold would result in current thresholds 9 amps and 11 amps, respectively, and PF thresholds of between 0.72 and 0.88 It is noted that many of the monitor thresholds may be single sided with only not to exceed values.

Accordingly, the method and apparatus in accordance with the invention enable the health status of a motor and/or connected actuator where multiple motors are powered from the same motor control to be determined in a simple and efficient manner.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A system for determining the health of a motor drive system, comprising:
   a common motor controller;
   at least one motor electrically coupled to the common motor controller, wherein the common motor controller controls a voltage applied to the at least one motor;
   at least one current sensor operatively coupled to a respective motor of the at least one motor; and
   a monitor coupled to the at least one current sensor and communicatively coupled to the common motor controller, the monitor configured to:
   obtain voltage data from the common motor controller corresponding to thea voltage applied by the common motor controller to the at least one motor;
   obtain from each of the at least one current sensor a motor current for the respective motor;
   determine, based on the motor current and the voltage data, at least one of a motor phase shift or power factor; and
   determine the health of the motor drive system based on the at least one motor phase shift or power factor and the motor current.

2. The system according to claim 1, where in determining the health of the motor drive system the monitor is configured to:
   use the motor current and at least one of the motor phase shift or power factor to compare to respective thresholds in a look-up table;
   identify a motor current entry and at least one of a phase shift or power factor entry which is outside acceptable limits of the thresholds in the look-up table;
   retrieve a health condition from the look-up table that corresponds to the identified motor current entry and the at least one phase shift or power factor entry; wherein providing the alert includes providing the health condition as part of the alert.

3. The system according to claim 1, wherein the at least one motor comprises a plurality of motors, and the monitor is configured to determine the health of the motor drive system based on i) the determined motor current and at least one of phase shift or power factor for one motor of the plurality of motors, and ii) motor current and at least one of phase shift or power factor for other motors of the plurality of motors.

4. The system according to claim 1, wherein the monitor is further configured to disable or reconfigure a motor or motor drive system that has been determined to be abnormal.

5. The system according to claim 1, where in determining the health of the motor drive system the monitor is configured to determine that the motor drive system health is abnormal when the motor current and at least one of the motor phase shift or power factor do not correspond to at least one of a predetermined phase shift or power factor window and a predetermined motor current window, respectively.

6. The system according to claim 1, where in determining the health of the motor drive system the monitor is configured to determine that the motor health is abnormal when motor current and at least one of the motor phase shift or power factor correspond to at least one of high output torque, low output torque, motor stall, motor operation in a predetermined quadrant, an open circuit or a short circuit.

7. The system according to claim 1, wherein the plurality of sensors comprises at least one sensor capable of outputting a signal proportional to the current in at least one phase of a poly-phase electric motor.

8. The system according to claim 7, wherein the sensor comprises at least one of a coil of wire positioned to sense at least one individual input phase of the motor, a resistor or a hall effect device.

9. The system according to claim 1, wherein each current sensor comprises a first and second electrical conductor, and the first electrical conductor of each current sensor is electrically connected together to form a common lead, and the second electrical conductor from each current sensor and the common lead are connected to the controller such that a total number of electrical conductors from the plurality of current sensors to the controller is the number of motors or the number of monitored subsystems of motors plus one.

10. The system according to claim 1, wherein the monitor is configured to provide an alert upon the health of the motor drive system being abnormal.

11. The method according to claim 10, wherein the at least one motor comprises a plurality of motors, and determining the health of the motor drive system comprises basing the determination on i) the determined motor current and at least one of phase shift or power factor for one motor of the plurality of motors, and ii) motor current and at least one of phase shift or power factor for other motors of the plurality of motors.

12. The method according to claim 10, further comprising: annunciating the health condition; and
at least one of disabling the motor drive sub-system, placing the system into a predetermined safe operating mode, or taking no action upon determining the motor drive system health is abnormal.

13. The method according to claim 10, wherein determining the health of the motor drive system comprises determining that the motor drive system health is abnormal when the motor current and at least one of the motor phase shift or power factor are not within a predetermined current threshold and at least one of a predetermined phase shift or power factor threshold, respectively.

14. The method according to claim 10, wherein determining the health of the motor drive system comprises determining that the motor drive system health is abnormal when the motor current and at least one of the motor phase shift or power factor correspond to at least one of high output torque, low output torque, motor stall, motor operation in a predetermined quadrant, an open circuit or a short circuit.

15. The method according to claim 10, wherein determining the motor current includes determining a peak motor current.

16. The method according to claim 10, further comprising coupling conductors from each sensor to a monitor, wherein a total number of electrical conductors from the plurality of sensors to the controller is the number of motors plus one.

17. The method according to claim 10, further comprising providing an indication upon the health of the motor drive system being abnormal.

18. A method for determining the health of a motor drive system that includes at least one motor coupled to a common motor controller, the method comprising:
obtaining, via a sensor connected to an electrical input of the at least one motor, current data corresponding to current provided to the at least one motor;
obtaining voltage data corresponding to a voltage provided by the common motor controller;
determining, based on the current data and the voltage data, at least one of a motor phase shift or power factor; and
determining the health of the motor drive system based on the motor current and the at least one motor phase shift or power factor;
wherein the monitor is part of a motor drive controller that controls power provided by the common motor controller.

19. The method according to claim 18, wherein determining the health comprises:
using the determined motor current and at least one of phase shift or power factor to access a look-up table;
identifying a motor current entry and at least one of a phase shift or power factor entry in the look-up table that corresponds to the motor current and at least one of phase shift or motor power factor; and
retrieving a health condition from the look-up table that corresponds to the identified current entry and at least one of the phase shift or power factor entry.

* * * * *